US012786418B2

(12) United States Patent
Kalva et al.

(10) Patent No.: US 12,786,418 B2
(45) Date of Patent: Nov. 3, 2026

(54) SYSTEMS AND METHODS FOR OBJECT AND EVENT DETECTION AND FEATURE-BASED RATE-DISTORTION OPTIMIZATION FOR VIDEO CODING

(71) Applicant: OP Solutions, LLC, Amherst, MA (US)

(72) Inventors: Hari Kalva, Boca Raton, FL (US); Borivoje Furht, Boca Raton, FL (US); Velibor Adzic, Canton, GA (US)

( * ) Notice: Subject to any disclaimer, the term of this patent is extended or adjusted under 35 U.S.C. 154(b) by 55 days.

(21) Appl. No.: 18/651,735

(22) Filed: May 1, 2024

(65) Prior Publication Data

US 2024/0283942 A1 Aug. 22, 2024

Related U.S. Application Data

(63) Continuation of application No. PCT/US2022/047829, filed on Oct. 26, 2022.

(Continued)

(51) Int. Cl.
*H04N 19/147* (2014.01)
*G06V 10/26* (2022.01)

(Continued)

(52) U.S. Cl.
CPC .......... *H04N 19/147* (2014.11); *G06V 10/26* (2022.01); *G06V 10/7715* (2022.01);

(Continued)

(58) Field of Classification Search
CPC .... G06V 10/82; G06V 10/7715; G06V 10/26; G06V 20/70; G06V 20/44; G06V 20/46;

(Continued)

(56) References Cited

U.S. PATENT DOCUMENTS

2006/0282874 A1* 12/2006 Ito .......................... H04N 5/60 348/E5.002
2013/0163831 A1* 6/2013 Tanaka ................ G06V 40/161 382/118

(Continued)

FOREIGN PATENT DOCUMENTS

WO 2020188273 A1 9/2020

OTHER PUBLICATIONS

International Organisation for Standardisation ISO/IEC JTC1/SC29/WG11, Coding of Moving Pictures and Audio, ISO/IEC JTC1/SC29NVG11 MPEG2019/M51300, Oct. 2019, Geneva, Switzerland, Chen et. al, XP30221702A1.

(Continued)

*Primary Examiner* — Neil R Mikeska
(74) *Attorney, Agent, or Firm* — OP Solutions IP Department; Paul Ackerman

(57) ABSTRACT

Systems and methods for event and object detection and annotation in the video streams may include extracting a plurality of features in a picture in a video frame, grouping at least a portion of the plurality of features into at least one object, determining a region for the at least one object, assigning object identifiers to the at least one object and encoding the object identifiers into the bitstream. Feature-based rate distortion optimization may be employed for video coding including extracting a set of features from a picture in the video, generating a relevance map for the extracted features, determining a relevance score for portions of the picture using the relevance map, and encoding the portion of the picture with a bit rate determined at least in part by the relevance score.

10 Claims, 13 Drawing Sheets

Related U.S. Application Data

(60) Provisional application No. 63/275,700, filed on Nov. 4, 2021, provisional application No. 63/275,740, filed on Nov. 4, 2021.

(51) Int. Cl.

| | |
|---|---|
| ***G06V 10/77*** | (2022.01) |
| ***G06V 20/40*** | (2022.01) |
| ***G06V 20/70*** | (2022.01) |
| ***H04N 19/115*** | (2014.01) |
| ***H04N 19/167*** | (2014.01) |
| ***H04N 19/172*** | (2014.01) |
| ***H04N 19/70*** | (2014.01) |

(52) U.S. Cl.

CPC .............. *G06V 20/44* (2022.01); *G06V 20/46* (2022.01); *G06V 20/70* (2022.01); *H04N 19/115* (2014.11); *H04N 19/167* (2014.11); *H04N 19/172* (2014.11); *H04N 19/70* (2014.11)

(58) Field of Classification Search

CPC .. H04N 19/172; H04N 19/115; H04N 19/167; H04N 19/147; H04N 19/20; H04N 19/17; H04N 19/70

See application file for complete search history.

(56) References Cited

U.S. PATENT DOCUMENTS

| | | | | |
|---|---|---|---|---|
| 2014/0269901 | A1* | 9/2014 | Shi | H04N 19/124<br>375/240.03 |
| 2014/0333775 | A1* | 11/2014 | Naikal | H04N 21/44008<br>348/159 |
| 2015/0379354 | A1* | 12/2015 | Zhou | G06V 20/40<br>382/103 |
| 2016/0014411 | A1 | 1/2016 | Sychev | |
| 2017/0249739 | A1 | 8/2017 | Kallenberg | |
| 2020/0389658 | A1 | 12/2020 | Kim | |
| 2021/0076016 | A1 | 3/2021 | Sviridenko | |
| 2021/0090217 | A1 | 3/2021 | Jiang | |
| 2021/0248400 | A1* | 8/2021 | Cronje | G06N 3/0985 |
| 2022/0009499 | A1* | 1/2022 | Inami | B60W 40/02 |
| 2022/0210435 | A1 | 6/2022 | Kang | |
| 2023/0067541 | A1 | 3/2023 | Boyce | |
| 2023/0085554 | A1 | 3/2023 | Kim | |
| 2023/0353764 | A1 | 11/2023 | Ikonin | |
| 2023/0412796 | A1 | 12/2023 | Liu | |
| 2024/0137548 | A1 | 4/2024 | Joshi | |
| 2024/0283942 | A1* | 8/2024 | Kalva | G06V 10/82 |
| 2024/0412385 | A1* | 12/2024 | Yamazaki | G06T 7/246 |

OTHER PUBLICATIONS

International Organisation for Standardisation ISO/IEC JTC1/SC29/WG11, Coding of Moving Pictures and Audio, ISO/IEC JTC1/SC29/WG11 MPEG2020/M52123, Jan. 2020, Brussels, Belgium, Yu et. al, XP30224753A1.

Video Coding for Machines: A Paradigm of Collaborative Compression and Intelligent Analytics, Duan et al., arXiv:2001.03569v2 [cs.CV]Jan. 13, 2020.

International Organisation for Standardisation ISO/IEC JTC1/SC29/WG11, Coding of Moving Pictures and Audio, ISO/IEC JTC1/SC29/WG11 N18992, Jan. 2020, Brussels, Belgium.

International Organisation for Standardisation ISO/IEC JTC1/SC29/WG11, Coding of Moving Pictures and Audio, ISO/IEC JTC1/SC29/WG11 MPEG2020/M52352, Jan. 2020, Brussels, Belgium, Muller et. al.

Polygonal Approximation of an Object Contour by Detecting Edge Dominant Corners using Iterative Corner Suppression, Nachar et al.

An end-to-end distributed video analysis system using HEVC annotated regions SEI message, Guruvareddiar et al., Proc. of SPIE, vol. 11842,118420B, 2021.

Search Report in EP22890627.7, Jul. 25, 2025.

* cited by examiner

Input picture

Picture with the detected bounding boxes

Picture with the detected contours

SYSTEMS AND METHODS FOR OBJECT AND EVENT DETECTION AND FEATURE-BASED RATE-DISTORTION OPTIMIZATION FOR VIDEO CODING

CROSS-REFERENCE TO RELATED APPLICATIONS

The present application is a continuation of International Application PCT/US2022/047829 filed on Oct. 26, 2022, and entitled SYSTEMS AND METHODS FOR OBJECT AND EVENT DETECTION AND FEATURE-BASED RATE-DISTORTION OPTIMIZATION FOR VIDEO CODING, which application claims the benefit of priority to U.S. Provisional Patent Application Ser. No. 63/275,700 filed on Nov. 4, 2021 and entitled Systems and Methods for Object and Event Detection and Annotation in the Video Streams and also claims the benefit of priority to U.S. Provisional Patent Application Ser. No. 63/275,740 filed on Nov. 4, 2021 and entitled Systems and Methods for Feature-Based Rate Distortion Optimization for Video Coding, the disclosures of which are incorporated herein by reference in their entireties.

FIELD OF THE INVENTION

The present invention generally relates to the field of video encoding and decoding. In particular, the present invention is directed to systems and methods for object and event detection and feature-based rate-distortion optimization for video coding.

BACKGROUND

A video codec can include an electronic circuit or software that compresses or decompresses digital video. It can convert uncompressed video to a compressed format or vice versa. In the context of video compression, a device that compresses video (and/or performs some function thereof) can typically be called an encoder, and a device that decompresses video (and/or performs some function thereof) can be called a decoder.

A format of the compressed data can conform to a standard video compression specification. The compression can be lossy in that the compressed video lacks some information present in the original video. A consequence of this can include that decompressed video can have lower quality than the original uncompressed video because there is insufficient information to accurately reconstruct the original video.

There can be complex relationships between the video quality, the amount of data used to represent the video (e.g., determined by the bit rate), the complexity of the encoding and decoding algorithms, sensitivity to data losses and errors, case of editing, random access, end-to-end delay (e.g., latency), and the like.

Motion compensation can include an approach to predict a video frame or a portion thereof given a reference frame, such as previous and/or future frames, by accounting for motion of the camera and/or objects in the video. It can be employed in the encoding and decoding of video data for video compression, for example in the encoding and decoding using the Motion Picture Experts Group (MPEG)'s advanced video coding (AVC) standard (also referred to as H.264). Motion compensation can describe a picture in terms of the transformation of a reference picture to the current picture. The reference picture can be previous in time when compared to the current picture, from the future when compared to the current picture. When images can be accurately synthesized from previously transmitted and/or stored images, compression efficiency can be improved.

Recent trends in robotics, surveillance, monitoring, Internet of Things, etc. introduced use cases in which significant portion of all the images and videos that are recorded in the field is consumed by machines only, without ever reaching human eyes. Those machines process images and videos with the goal of completing tasks such as object detection, object tracking, segmentation, event detection etc. Recognizing that this trend is prevalent and will only accelerate in the future, international standardization bodies established efforts to standardize image and video coding that is primarily optimized for machine consumption. For example, standards like JPEG AI and Video Coding for Machines are initiated in addition to already established standards such as Compact Descriptors for Visual Search, and Compact Descriptors for Video Analytics.

Rate distortion optimization can be used to improve video encoding. As the name suggests, this process refers to the optimization of the amount of distortion (loss of video quality) against the amount of data required to encode the video, i.e., the rate. The present disclosure relates, in part, to systems and methods of rate distortion optimization applied in the context of video coding for machine consumption and hybrid video systems.

SUMMARY OF THE DISCLOSURE

A method of encoding video is provided that includes extracting a plurality of features in a picture in a video frame, grouping at least a portion of the plurality of features into at least one object, determining a region for the at least one object, assigning object identifiers to the at least one object, and encoding the object identifiers into the bitstream. In some embodiments, a feature model is used to extract the plurality of features. The object identifiers may include a region identifier and a label for each object.

The region is preferably represented by a geometric representation. In certain embodiments, the geometric representation is a bounding box or a contour. When the geometric representation is a bounding box, the bounding box may be a rectangle identified by the coordinates of a specific corner and the width and height of the bounding box. Alternatively, the bounding box may be a rectangle identified by the coordinates two diagonally opposing corners. If the geometric representation is a contour, the contour may be represented by a consecutive set of corners. For example, a first corner and consecutive corners clockwise or counterclockwise defining the entire contour. In each case, the bounding box or contour may be defined at a coding unit level and the corners represent a corner of a coding unit.

In some embodiments, an object may be further evaluated over a sequence of frames to determine an event. An event identifier cam be associated with an object and the event identifier encoded into the bitstream.

The object identifiers and event identifier can be inserted into the encoded bitstream. This information may be provided as supplemental enhancement information. Alternatively or in addition, the bitstream may include a slice header and the sliced header may signal the presence of an object in a given slice.

The video coding method for identifying objects and events may further include features for rate distortion optimization, including generating a relevance map for the extracted features, determining a relevance score for portions of the picture using the relevance map, and encoding the portion of the picture with a bit rate determined at least in part by the relevance score.

A method for encoding video with rate distortion optimization includes extracting a set of features from a picture in the video, generating a relevance map for the extracted features; determining a relevance score for portions of the picture using the relevance map, and encoding the portion of the picture with a bit rate determined at least in part by the relevance score. IN some embodiments, the picture is represented by a plurality of coding units and the relevance map is determined at the coding unit level with each coding unit having a coding unit relevance score. The encoding operation preferably includes allocating a bit rate for each coding unit. In some cases, the relevance score may include a relative relevance score for each coding unit.

In some embodiments, the encoding operations includes at least one of intra prediction, motion estimation, and transform quantization. In this case, the relative relevance score may be used in an explicit rate distortion optimization mode to alter the encoding during at least one of the intra prediction, motion estimation, and transform quantization processes. Alternatively, the relative relevance score can also be used in a rate distortion function to determine an adjusted bitrate for each coding unit.

The video encoding method with rate distortion optimization can also use the extracted features for object and event identification. In some embodiments, this may include grouping at least a portion of the extracted features into at least one object, determining a region for the at least one object, assigning object identifiers to the at least one object, and encoding the object identifiers into the bitstream.

An encoded video bitstream is also provided. The encoded bitstream includes encoded video content data which has at least one object identified by an encoder extracting a plurality of features of a picture in the video content. The bitstream includes at least one object identifier and associated object annotation and at least one event identifier and associated event annotation. The bitstream may include a supplemental enhancement information (SEI) message, wherein information related to the at least one object and at least one event is signaled in the SEI message. Alternatively or additionally, the bitstream may include a slice header, wherein information related to the at least one object and at least one event in a video slice is signaled in the slice header.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Figure 1:
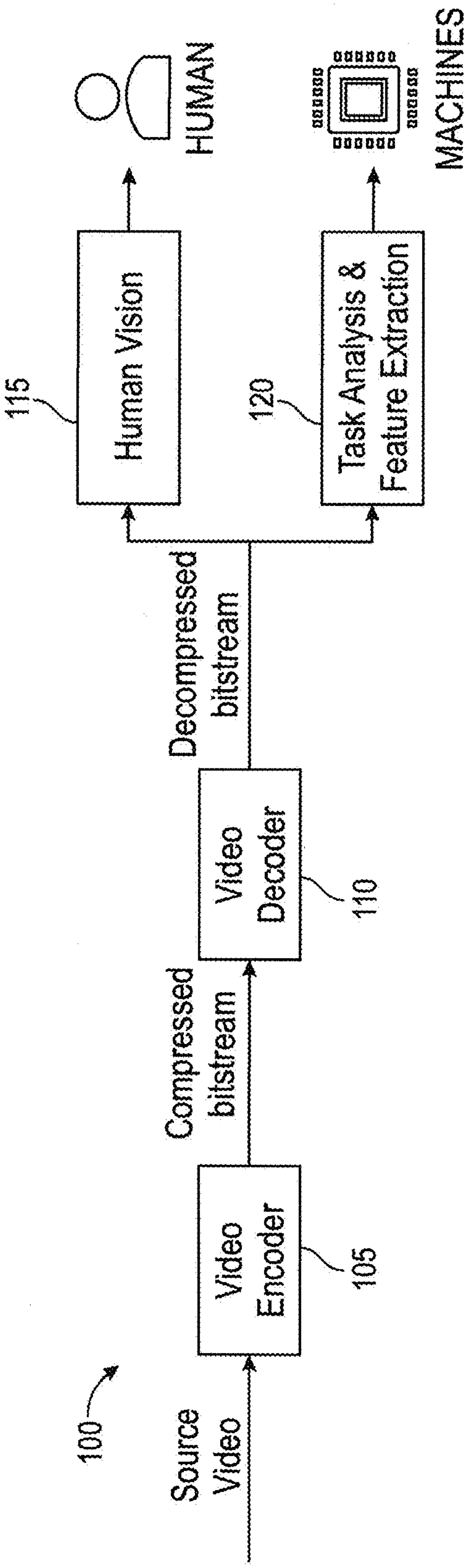
FIG. 1 is a block diagram illustrating an exemplary embodiment of a hybrid video coding system.

In many applications, such as surveillance systems with multiple cameras, intelligent transportation, smart city applications, and/or intelligent industry applications, traditional video coding may require compression of large number of videos from cameras and transmission through a network to machines and for human consumption. Subsequently, at a machine site, algorithms for feature extraction may applied typically using convolutional neural networks or deep learning techniques including object detection, event action recognition, pose estimation and others. FIG. 1 shows an exemplary embodiment of a standard VVC coder applied for machines. Conventional approaches unfortunately require a massive video transmission from multiple cameras, which may take significant time for efficient and fast real-time analysis and decision-making. In embodiments, a video coding for machines ("VCM") approach may resolve this problem by both encoding video and extracting some features at a transmitter site and then transmitting a resultant encoded bit stream to a VCM decoder. As used herein, the term VCM is not limited to a specific proposed protocol but more generally includes all systems for coding and decoding video for machine consumption. At a decoder site video may be decoded for human vision and features may be decoded for machines. Systems which provide video for both human vision and for machine consumption are sometimes referred to as hybrid systems. The systems and methods disclosed herein are intended to apply to machine-based systems as well as hybrid systems.

A system and a method for rate-distortion optimization (RDO) for video coding based on the extracted features from the input video is disclosed. This method is suitable for any system that receives as input the video signal and can conduct both the feature extraction and video coding. Feature extraction can be classified as any computer vision task, such as edge detection, line detection, object detection, or more recent techniques such as convolutional neural networks where the output of the feature extraction can be spatially mapped back onto the pixel space of the input video. Video coding can include any standard video encoder that employs rate-distortion optimization, and/or encoding techniques such as partitioning, motion estimation and transform/quantization, such as Versatile Video Coding (VVC), or High Efficiency Video Coding (HEVC).

Embodiments of a system that supports the present methods is a Video Coding for Machines system depicted in FIGS. 1-2 below.

FIG. 1 is a high-level block diagram of a system for encoding and decoding video in a hybrid system which includes consumption of the video content by both human viewers and machine consumption. A source video is received by a video encoder 105 which provides a compressed bitstream for transmission over a channel to video decoder 110. The video encoder may encode the video for human consumption as well as encoding the video for machine consumption. The video decoder 110 provides complimentary processing on the compressed bitstream to extract the video for human vision 115 as well as task analysis and feature extraction 120 for machine consumption.

Figure 2:
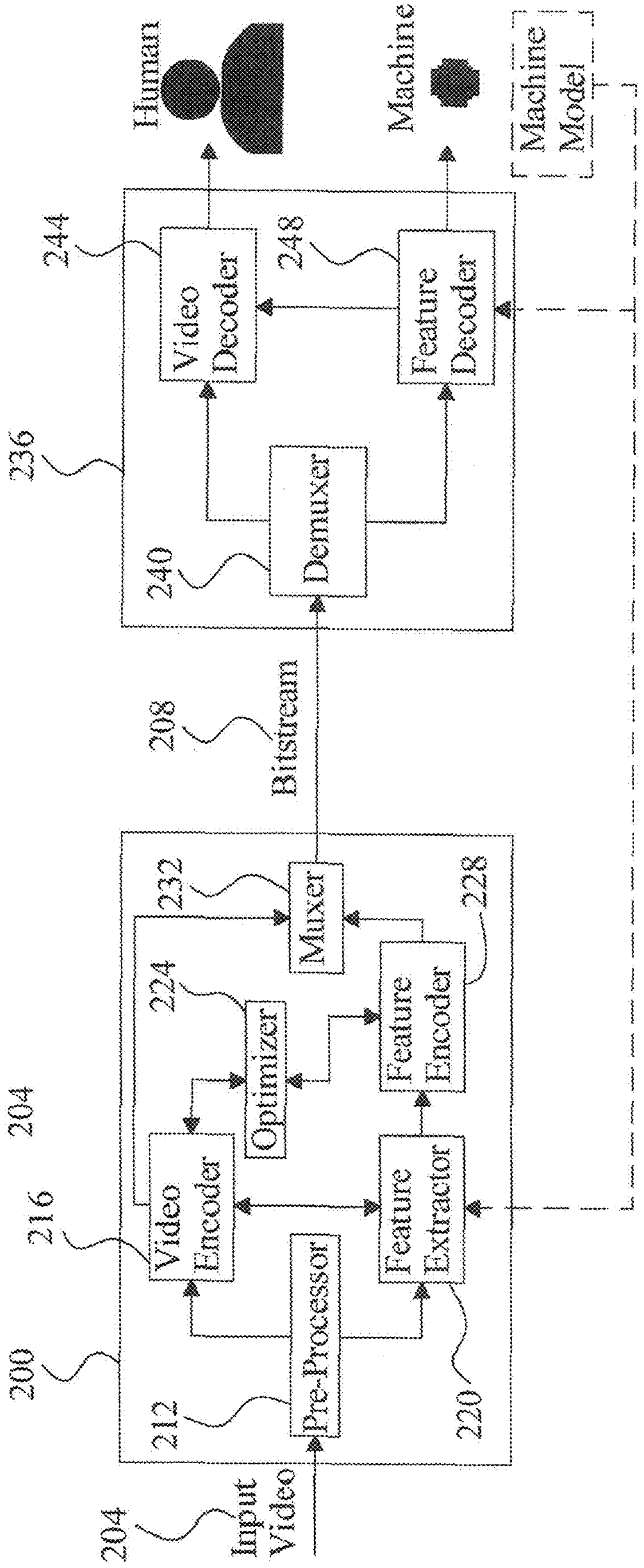
FIG. 2 is a block diagram illustrating an exemplary embodiment of a video coding for machines or hybrid system.

Referring now to FIG. 2, an exemplary embodiment of encoder for video coding for machines (VCM) is illustrated. VCM encoder 200 may be implemented using any circuitry including without limitation digital and/or analog circuitry; VCM encoder 200 may be configured using hardware configuration, software configuration, firmware configuration, and/or any combination thereof. VCM encoder 200 may be implemented as a computing device and/or as a component of a computing device, which may include without limitation any computing device as described below. In an embodiment, VCM encoder 200 may be configured to receive an input video 204 and generate an output bitstream 208. Reception of an input video 204 may be accomplished in any manner described below. A bitstream may include, without limitation, any bitstream as described below.

VCM encoder 200 may include, without limitation, a pre-processor 212, a video encoder 216, a feature extractor 220, an optimizer 224, a feature encoder 228, and/or a multiplexor 232. Pre-processor 212 may receive input video 204 stream and parse out video, audio and metadata sub-streams of the stream. Pre-processor 212 may include and/or communicate with decoder as described in further detail below; in other words, Pre-processor 212 may have an ability to decode input streams. This may allow, in a non-limiting example, decoding of an input video 204, which may facilitate downstream pixel-domain analysis.

Further referring to FIG. 2, VCM encoder 200 may operate in a hybrid mode and/or in a video mode. When in the hybrid mode, VCM encoder 200 may be configured to encode a visual signal that is intended for human consumers, to encode a feature signal that is intended for machine consumers; machine consumers may include, without limitation, any devices and/or components, including without limitation computing devices as described in further detail below. Input signal may be passed, for instance when in hybrid mode, through pre-processor 212.

Still referring to FIG. 2, video encoder 216 may include without limitation any video encoder 216 as described in further detail below. When VCM encoder 200 is in hybrid mode, VCM encoder 200 may send unmodified input video 204 to video encoder 216 and a copy of the same input video 204, and/or input video 204 that has been modified in some way, to feature extractor 220. Modifications to input video 204 may include any scaling, transforming, or other modification that may occur to persons skilled in the art upon reviewing the entirety of this disclosure. For instance, and without limitation, input video 204 may be resized to a smaller resolution, a certain number of pictures in a sequence of pictures in input video 204 may be discarded, reducing framerate of the input video 204, color information may be modified, for example and without limitation by converting an RGB video might be converted to a grayscale video, or the like.

Still referring to FIG. 2, video encoder 216 and feature extractor 220 are connected and might exchange useful information in both directions. For example, and without limitation, video encoder 216 may transfer motion estimation information to feature extractor 220, and vice-versa. Video encoder 216 may provide Quantization mapping and/or data descriptive thereof based on regions of interest (ROI), which video encoder 216 and/or feature extractor 220 may identify, to feature extractor 220, or vice-versa. Video encoder 216 may provide to feature extractor 220 data describing one or more partitioning decisions based on features present and/or identified in input video 204, input signal, and/or any frame and/or subframe thereof; feature extractor 220 may provide to video encoder 216 data describing one or more partitioning decisions based on features present and/or identified in input video 204, input signal, and/or any frame and/or subframe thereof. Video encoder 216 feature extractor 220 may share and/or transmit to one another temporal information for optimal group of pictures (GOP) decisions. Each of these techniques and/or processes may be performed, without limitation, as described in further detail below.

With continued reference to FIG. 2, feature extractor 220 may operate in an offline mode or in an online mode. Feature extractor 220 may identify and/or otherwise act on and/or manipulate features. A “feature,” as used in this disclosure, is a specific structural and/or content attribute of data. Examples of features may include SIFT, audio features, color hist, motion hist, speech level, loudness level, or the like. Features may be time stamped. Each feature may be associated with a single frame of a group of frames. Features may include high level content features such as timestamps, labels for persons and objects in the video, coordinates for objects and/or regions-of-interest, frame masks for region-based quantization, and/or any other feature that may occur to persons skilled in the art upon reviewing the entirety of this disclosure. As a further non-limiting example, features may include features that describe spatial and/or temporal characteristics of a frame or group of frames. Examples of features that describe spatial and/or temporal characteristics may include motion, texture, color, brightness, edge count, blur, blockiness, or the like. When in offline mode, all machine models as described in further detail below may be stored at encoder and/or in memory of and/or accessible to encoder. Examples of such models may include, without limitation, whole or partial convolutional neural networks, keypoint extractors, edge detectors, salience map constructors, or the like. When in online mode one or more models may be communicated to feature extractor 220 by a remote machine in real time or at some point before extraction.

Still referring to FIG. 2, feature encoder 228 is configured for encoding a feature signal, for instance and without limitation as generated by feature extractor 220. In an embodiment, after extracting the features feature extractor 220 may pass extracted features to feature encoder 228. Feature encoder 228 may use entropy coding and/or similar techniques, for instance and without limitation as described below, to produce a feature stream, which may be passed to multiplexor 232. Video encoder 216 and/or feature encoder 228 may be connected via optimizer 224; optimizer 224 may exchange useful information between those video encoder 216 and feature encoder 228. For example, and without limitation, information related to codeword construction and/or length for entropy coding may be exchanged and reused, via optimizer 224, for optimal compression.

In an embodiment, and continuing to refer to FIG. 2, video encoder 216 may produce a video stream; video stream may be passed to multiplexor 232. Multiplexor 232 may multiplex video stream with a feature stream generated by feature encoder 228; alternatively or additionally, video and feature bitstreams may be transmitted over distinct channels, distinct networks, to distinct devices, and/or at distinct times or time intervals (time multiplexing). Each of video stream and feature stream may be implemented in any manner suitable for implementation of any bitstream as described in this disclosure. In an embodiment, multiplexed video stream and feature stream may produce a hybrid bitstream, which may be is transmitted as described in further detail below.

Still referring to FIG. 2, where VCM encoder 200 is in video mode, VCM encoder 200 may use video encoder 216 for both video and feature encoding. Feature extractor 220 may transmit features to video encoder 216; the video encoder 216 may encode features into a video stream that may be decoded by a corresponding video decoder 244. It should be noted that VCM encoder 200 may use a single video encoder 216 for both video encoding and feature encoding, in which case it may use different set of parameters for video and features; alternatively, VCM encoder 200 may two separate video encoder 216*s*, which may operate in parallel.

Still referring to FIG. 2, system 200 may include and/or communicate with, a VCM decoder 236. VCM decoder 236 and/or elements thereof may be implemented using any circuitry and/or type of configuration suitable for configuration of VCM encoder 200 as described above. VCM decoder 236 may include, without limitation, a demultiplexor 240. Demultiplexor 240 may operate to demultiplex bitstreams if multiplexed as described above; for instance and without limitation, demultiplexor 240 may separate a multiplexed bitstream containing one or more video bitstreams and one or more feature bitstreams into separate video and feature bitstreams.

Continuing to refer to FIG. 2, VCM decoder 236 may include a video decoder 244. Video decoder 244 may be implemented, without limitation in any manner suitable for a decoder as described in further detail below. In an embodiment, and without limitation, video decoder 244 may generate an output video, which may be viewed by a human or other creature and/or device having visual sensory abilities.

Still referring to FIG. 2, VCM decoder 236 may include a feature decoder 248. In an embodiment, and without limitation, feature decoder 248 may be configured to provide one or more decoded data to a machine. Machine may include, without limitation, any computing device as described below, including without limitation any microcontroller, processor, embedded system, system on a chip, network node, or the like. Machine may operate, store, train, receive input from, produce output for, and/or otherwise interact with a machine model as described in further detail below. Machine may be included in an Internet of Things (IoT), defined as a network of objects having processing and communication components, some of which may not be conventional computing devices such as desktop computers, laptop computers, and/or mobile devices. Objects in IoT may include, without limitation, any devices with an embedded microprocessor and/or microcontroller and one or more components for interfacing with a local area network (LAN) and/or wide-area network (WAN); one or more components may include, without limitation, a wireless transceiver, for instance communicating in the 2.4-2.485 GHZ range, like BLUETOOTH transceivers following protocols as promulgated by Bluetooth SIG, Inc. of Kirkland, Wash, and/or network communication components operating according to the MODBUS protocol promulgated by Schneider Electric SE of Rueil-Malmaison, France and/or the ZIGBEE specification of the IEEE 802.15.4 standard promulgated by the Institute of Electronic and Electrical Engineers (IEEE). Persons skilled in the art, upon reviewing the entirety of this disclosure, will be aware of various alternative or additional communication protocols and devices supporting such protocols that may be employed consistently with this disclosure, each of which is contemplated as within the scope of this disclosure.

With continued reference to FIG. 2, each of VCM encoder 200 and/or VCM decoder 236 may be designed and/or configured to perform any method, method step, or sequence of method steps in any embodiment described in this disclosure, in any order and with any degree of repetition. For instance, each of VCM encoder 200 and/or VCM decoder 236 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Each of VCM encoder 200 and/or VCM decoder 236 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 3:
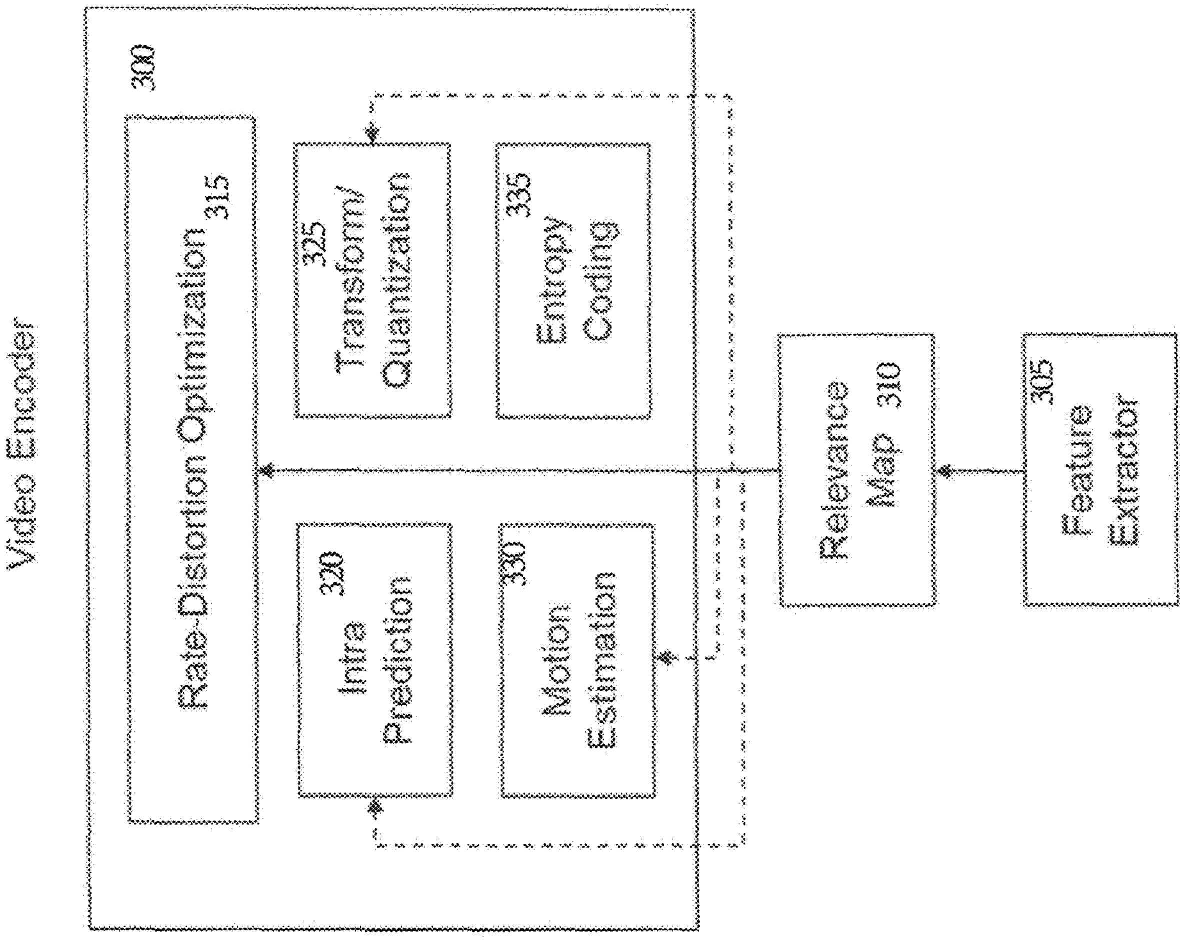
FIG. 3 is a block diagram further illustrating an exemplary embodiment of a video coding for machines system.

FIG. 3 is a block diagram further illustrating an encoder with feature and objection detection and rate distortion optimization. Input video is passed to the feature extractor which computes and extracts relevant features and sends pertinent information about those features (size, position, relevance score, labels, etc.) to the encoder, which uses this information to adjust the rate-distortion optimization such that the areas with more relevant features are encoded with higher quality (higher bitrate). The distribution of the available bandwidth is modulated based on the relevance mapping, instead of the default, content-agnostic distribution used by the encoder. Relevant components are depicted in FIG. 3, including rate distortion optimization 315, intra prediction 320, transform/quantization 325, motion estimation 330, and entropy encoding 335.

Figure 7:
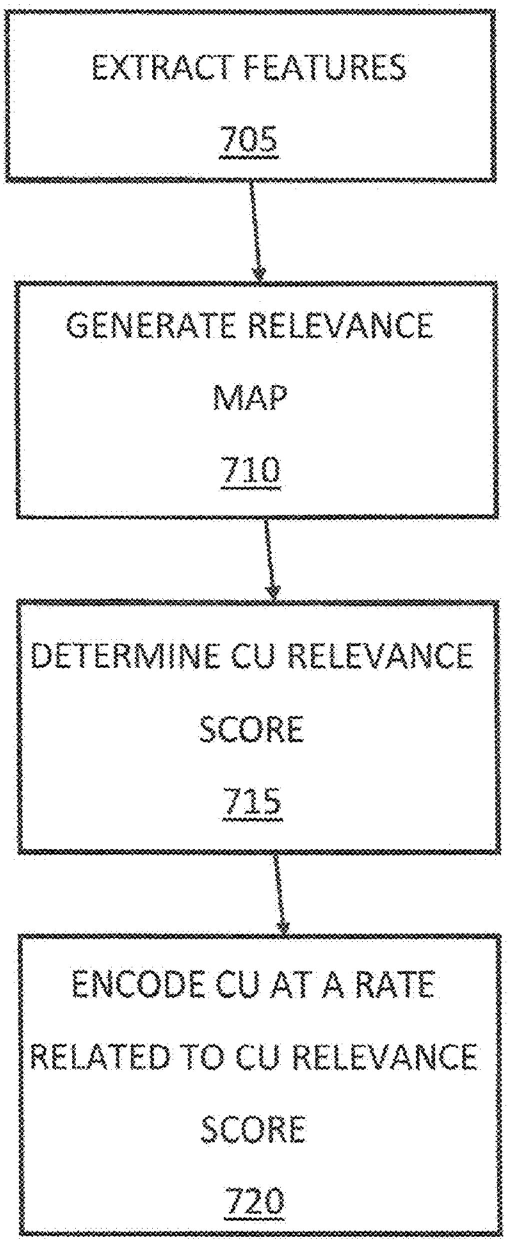
FIG. 7 is a simplified flow diagram of a method of feature-based rate distortion optimization in accordance with the present disclosure.

There are four basic stages of operation: feature extraction 305, feature relevance mapping 310, an application of the relevance map in the rate-distortion optimization process and encoding at a rate related to feature relevance by the video encoder 300. This process is further illustrated in the flow diagram of FIG. 7. At a high level, an encoding method with rate distortion optimization in accordance with the present disclosure extracts features from the input video (step 705), generates a relevance map of those features, preferably at the coding unit level (step 710), determines a CU relevance score (step 715) and encodes each CU at a rate that is determined, at least in part, by the relevance score of the CU. These steps are further described below.

FIG. 3 depicts the components of the proposed system and connections between them. Feature extractor 305 produces relevance map that is used by the encoder in two possible modes-explicit mode (dashed lines), or implicit mode (solid line). Following are detailed explanation of each of the components and modes.

Feature Extraction

As stated earlier, the feature extractor 305 conducts a process by which relevant features are extracted from the input video. Feature extractor 305 can implement simpler image processing and computer vision techniques such as edge, line, object detection, or more complex techniques such as Convolutional Neural Networks (CNNs) which can detect and identify objects and actions.

Any feature extraction process that can be mapped to the pixel positions of the input image can be used to generate relevance maps 310. In the examples where edges, lines, and objects are detected, the corresponding pixels that represent/contain the edges, lines or objects are assigned appropriate high-relevance values, while the rest of the pixels in the picture are assigned low-relevance values. Each pixel of the input picture is assigned a relevance value in the relevance map.

In the examples where CNNs are used, the outputs of the arbitrary convolutional layer, also known as the feature maps, are mapped back onto the input pixels with appropriate pixel values.

Embodiments described herein may perform and/or be configured to perform object and event detection and annotation using the VCM encoder. An input picture is passed to both the feature extractor and video encoder. Video encoder is connected to the feature extractor 305 and can receive additional information about the input picture. Once the picture is processed by the feature extractor 305, the relevant information about the detected objects and events is sent to the video encoder 300.

Feature extractor 305 uses feature models such as convolutional neural networks, keypoint extractors, edge detectors, salience map constructors, etc. to extract relevant information about the objects and events in the input pictures.

Figure 4A:
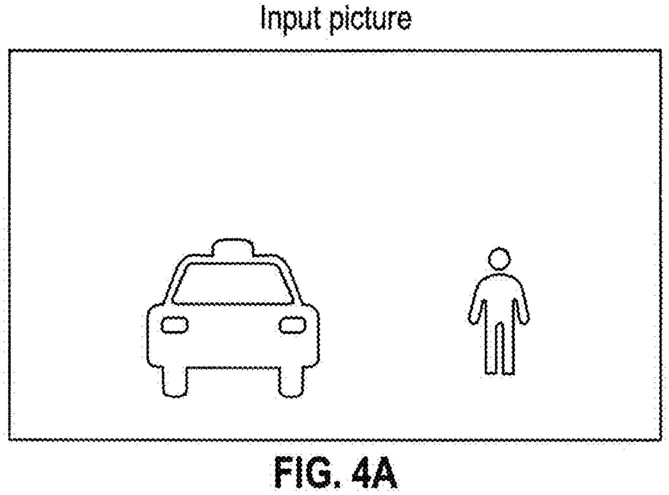
FIGS. 4A-4C are pictorial diagrams illustrating exemplary embodiments of an input picture, feature detections with bounding boxes and objects with detected contours.
Figure 4B:
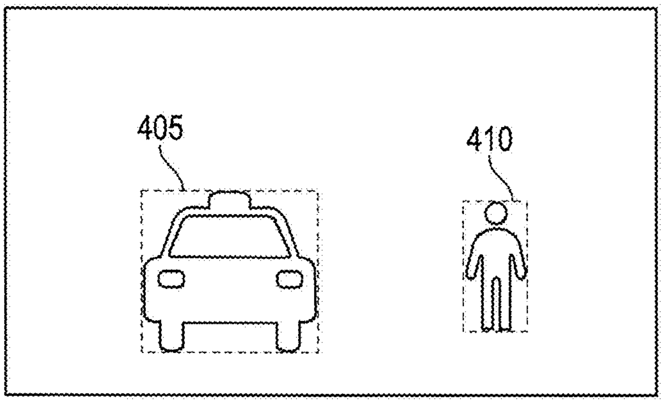
Figure 4C:
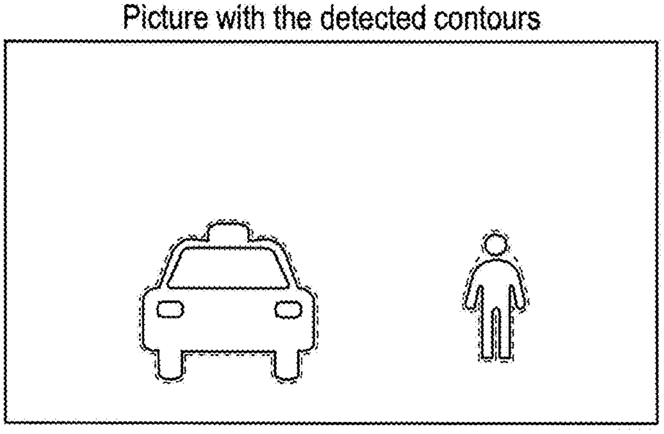

The output of the feature extractor 305 is a set of [region, label] pairs for each picture. Regions can be represented as bounding boxes (FIG. 4B), contours (FIG. 4C), or other geometric representations. Labels are represented as words, strings, or other unique identifiers. Example of the input picture and feature detections is presented in FIGS. 4A and 4B, respectively.

The bounding boxes 405, 410 can be represented using top left corner coordinates and width and height: (x, y, w, h). The contour can be represented using the clockwise consecutive set of corners, for example: (x1, y1, x2, y2, x3, y3, x4, y4, x5, y5), the edges between corners can be implicitly drawn using the neighboring corners' coordinates. The labels for each detection can be represented as strings of characters representing relevant words, such as "car", "person", etc.

Detections for the input picture are sent to the video encoder in the form of the set of triplets, for example: [(x1, y1, w1, h1), "car", id1, (x2, y2, w2, h2), "person", id2]—the third parameter is used for event id's and is equal to 0 if the detection is for object, not an event. The video encoder can copy or convert this information to the appropriate format of the annotations that are added to the video stream as a metadata or explicitly signaled.

To extend the concept of detections from objects to events, the feature extractor 305 can process multiple consecutive pictures and combine individual picture detections into a higher abstraction. One example of this process is when feature extractor 305 detects a car that occupies same spatial region in n consecutive pictures, and a person that occupies spatial region that is becoming closer to the car region in subsequent pictures. In this case, the whole sequence of detections can be abstracted into the event labeled "person entering car". The event is signaled using the event id, which is present in multiple consecutive pictures and is interpreted as such by the video encoder, the list of events is sent to the video encoder as a set of pairs [id, "event"]. Example for an object detection: [(x1, y1, w1, h1), "car", 0, (x2, y2, w2, h2), "person", 0]. Example for an event detection: [(x1, y1, w1, h1), "car", 1, (x2, y2, w2, h2), "person", 1], [1, "person entering car"].

The video encoder can use the detections set information to map the detected regions to the coding units. Examples of the mapping are given in FIG. 5. The coding unit can be represented as a macroblock, tree coding unit or a coding unit, depending on the video coding standard used. Any coding unit that contains whole region or any part of it is considered as an annotated coding unit (ACU). Encoder can use the ACU information to adjust parameters of the encoding process, such as quantization, partitioning, prediction type, etc. In some cases, the ACUs contain information that is considered to have higher priority than the rest of the picture and is encoded accordingly, usually using more bandwidth, which corresponds to lower quantization level for example. In the case of event detections, encoder can, for example, use finer resolution of the motion estimation and fractional motion vector precision to preserve more details.

Some embodiments disclosed herein may perform and/or be configured to perform object and event annotation signaling to the video decoder using metadata. As already described the information about detections is passed from the feature extractor to the video decoder in the form of sets of pairs or triplets. This information can be passed as-is (copied) or converted to different representation which is then inserted into video bitstream as a metadata, for example using the SEI (Supplemental Enhancement Information). One example of such SEI message syntax is presented in the following table:

| | Descriptor |
|---|---|
| objects_and_events(payloadSize){ | |
| oe_num_elements | ue(v) |
| for(i=0; i <= oe_num_elements; i++){ | |
| oe_x[i] | u(16) |
| oe_y[i] | u(16) |
| oe_h[i] | u(16) |
| oe_w[i] | u(16) |
| oe_label[i] | st(v) |
| oe_id[i] | ue(v) |

-continued

| | Descriptor |
|---|---|
| } | |
| } | |
| objects_and_events_additional(varSize) | |

SEI message contains elements that are defined within the initial payloadSize bytes, with additional payload with unspecified size that is reserved for future use and extensions.

Any decoder that implements SEI message parsing can extract the SEI message from the bitstream and process information about the objects and events that are detected in the video sequence. Parsed information can be used by the encoder to produce textual report about the objects and events in the video, or it can be used to render geometric shapes on top of the video together with textual information, such as labels to assist human viewer in identifying objects and events.

Embodiments described herein may be performed and/or be configured to perform object and event annotation explicit signaling to the video decoder. Information about the objects and events that is received from the feature extractor can also be converted into coding unit syntax elements that are present either at the slice level or at the level of the coding-tree unit (CTU).

In one implementation slice header (SH) is used to signal the presence of the object or event in the given slice. If the slice contains object, or event, or part of the object or the event, the proposed syntax elements signal to the decoder presence of the object or event. The slice header contains the list of the coding units that belong to the annotated object or the event, in the sequential raster-scan order. Example of the SH element is given in the following table:

| | Descriptor |
|---|---|
| If(sh_objects_and_events_present_flag){ | |
| oe_num | ue(v) |
| for(i=0; i <= oe_num; i++){ | |
| oe_ctu[i] | u(16) |
| oe_label[i] | st(v) |
| oe_id[i] | ue(v) |
| } | |
| } | |

Upon receiving slice header, decoder parses the information and marks all the CTUs that contain parts of the objects and events. In this implementation the region containing annotated objects and events is always represented as a group of contiguous CTUs.

Figure 5A:
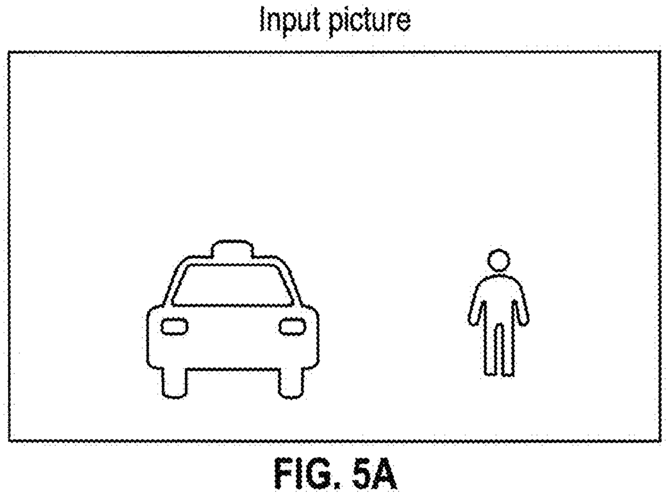
FIGS. 5A-5C are pictorial diagrams further illustrating an example of an input picture, feature detection with bounding boxes and objects with detected contours at the coding unit level.
Figure 5B:
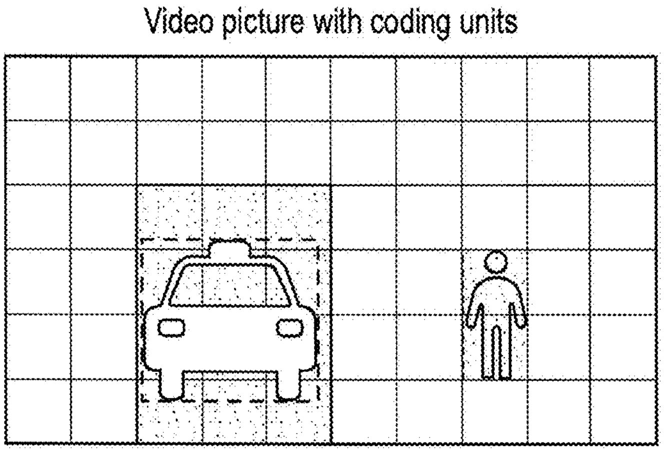
Figure 5C:
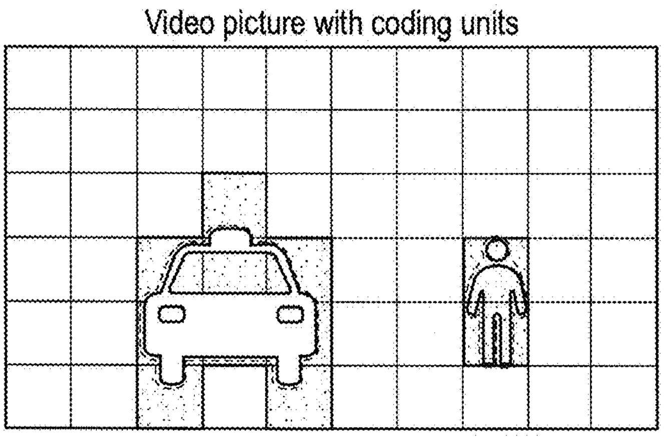

An example of the feature extraction that detects objects and outputs object contours at the coding unit level is depicted in FIGS. 5A-5C.

Relevance Map Generation:

Each pixel that belongs to the edge, line, object, or any other area that contains relevant features is assigned a value. Each pixel that does not belong to the relevant area is assigned a zero value, or some other low value. In the following examples, we will assume that the value range is between 0 and 1, and the real value number is assigned to each pixel. The proposed method supports other number ranges without limitations.

The values that are assigned are application-dependent and can be decided upon either in advance or normalized using the information obtained from the feature extraction process. For example, if only horizontal lines are detected, all pixel values that belong to the lines are assigned value 1.0, while all other pixels are assigned value 0.0. If extraction process detected lines of many orientations, the horizontal and vertical lines might be assigned higher values than the lines at the non-cardinal orientations, for example all cardinally oriented lines can be assigned value 1.0, all ordinally oriented lines can be assigned value 0.75, and all other lines 0.5. In the case of the object detection, if only one object is detected it can be assigned value 1.0, but if several objects are detected in the same picture, each can be assigned different value based on the size of the object or pre-determined importance of the given class of the objects. For example, the largest object can be assigned 1.0, and each subsequent object in the order of size can be assigned lower value. On the other hand, faces that are detected, regardless of the size can be assigned higher values than cars, etc.

Figure 6B:
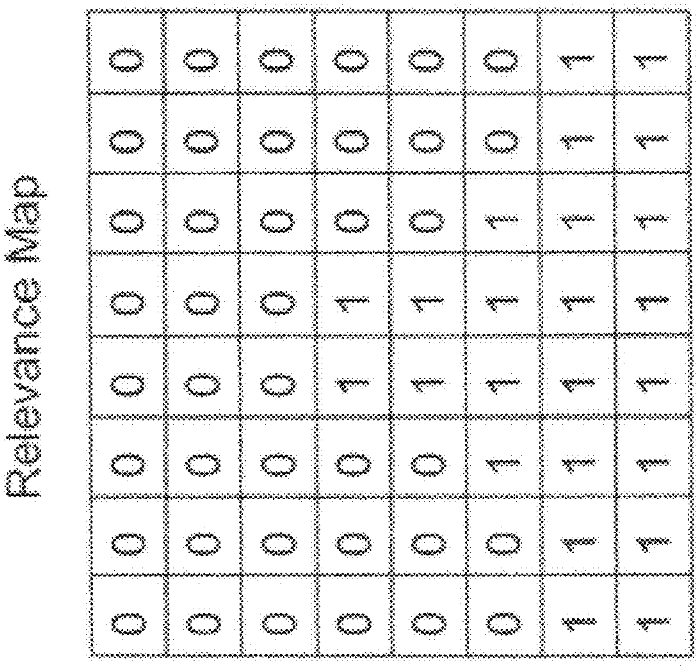
FIGS. 6A and 6B illustrate an example of an 8×8 pixel block that contains feature with contour, and the resulting 8×8 relevance map, respectively.
Figure 6A:
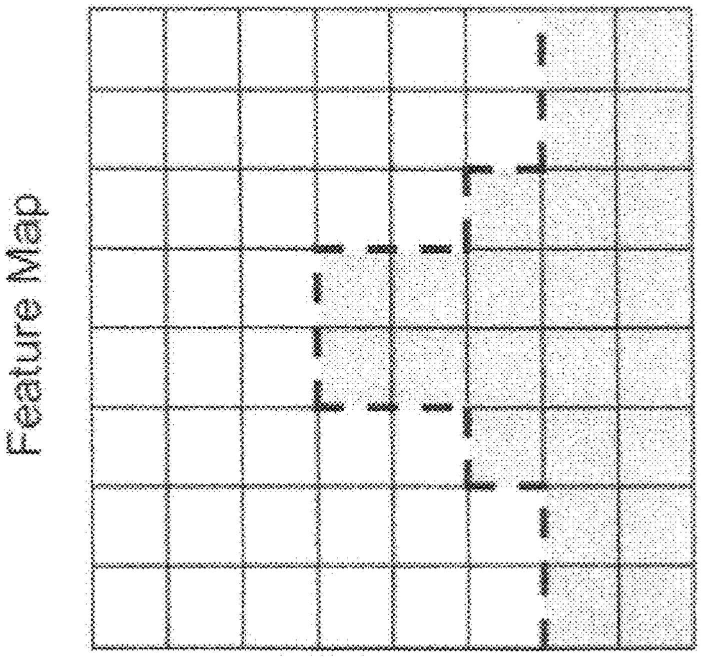

In FIG. 6A, we are depicting a simple example of an 8×8 pixel block that contains features with contour, and the resulting 8×8 relevance map illustrated in FIG. 6B. The full relevance map has the same dimensions as the input picture and is used by the encoder for mapping of the pixel relevance to the rate distortion optimization ("RDO") decisions.

Feature-Based RDO

Typically, video encoders do not make decisions on the single pixel level, but rather on the level of the so-called coding units (CUs). These are usually rectangular blocks of dimensions such as 64×64 pixels, 32×pixels, 16×16 pixels, etc. Since the RDO decisions are made on the level of single or group of CUs, the relevance map values of the pixels are averaged to obtain the CU relevance score.

As can be seen in FIGS. 6A and 6B, the CUs that contain features or parts of features will be designated as the more relevant as indicated by the value 1 in FIG. 6B, compared to all other CUs in the given picture.

Consequently, the video encoder will try to encode each CU in the given picture considering the relevance score, on top of all the other considerations that are present in the RDO algorithm by default. In most of the cases, the CUs with a lower relevance score will be encoded using lower bitrate and vice versa.

For each pixel p in the n×n CU, and each relevance value v(p), the relevance score ("RS") of the CU is calculated as follows:

$$RS(CU) = \frac{1}{n^2}\sum_{i=1}^{n^2} v(p_i)$$

This value is then compared to all the other RS(CU) values in the given picture and the relative relevance score ("RRS") is computed:

$$RRS(CU) = \frac{RS(CU)}{\sum_{k=1}^{K} RS(CU)k},$$

where K is the total number of CU units in the given picture.

The RRS(CU) is calculated for each unit that is under consideration by the encoder at the time of encoding. In other words, encoder might be estimating RD cost for one 64×64 unit and calculating its RRS(CU) value, and then estimating cost for the four 32×32 sub-units and calculating their RRS(CU) value.

The RRS(CU) is used by the RDO to adjust the bitrate allocation for each coding unit. There are two modes that can be used by the encoder to apply RRS to the encoding parameters: (1) Explicit mode: in this mode RRS(CU) is used to modulate decisions in the particular stage of the encoding-intra prediction, motion estimation, or transform/quantization; (2) Implicit mode: In this mode RRS(CU) is used directly in the rate-distortion function.

The following are descriptions of each mode.

Explicit Mode

In the explicit mode the encoder uses RRS(CU) to modulate decisions in the following processes: (1) Intra prediction 320—in particular, the partitioning process is adjusted based on the RRS(CU). Partitioning process is done in stages—each stage is performed at a higher depth of partitioning. Higher depth is producing smaller CUs, and hence allowing for finer details to be preserved. If the RRS(CU) is low, only the lower partitioning depth is estimated, and if the RRS (CU) is high, only the higher depth is estimated. In this way, the computational resources are saved, and the bitrate and quality are distributed according to the relevance. (2) Motion estimation 330—in particular, the motion estimation precision and search ranges are adjusted based on the RRS(CU). Low scores are turning off the fractional motion vector precision and reducing the motion vector search range. High scores are doing the opposite. Again, the effects of the adjustment are similar to the intra case. (3) Transform/quantization 325—in particular, the transform type and the quantization level are adjusted based on the RRS(CU). The transform that is used for lower score units is the simpler transform (for example, Hadamard transform instead of the Discrete Cosine Transform), while the higher score units still use full complexity transform. Quantization level is adjusted based on the RRS(CU) by directly applying the coefficient inversely proportional to the score to the quantization level (quantization parameter). Also, the highest RRS(CU) scores might use transform skip mode and encode as lossless areas of the picture that contain features of the highest relevance. Besides the transform skip mode, this can be achieved using the tools such as the ones available in the VVC standard for transform, scaling and quantization: disabling Sub-Block Transform (SBT), disabling Intra Sub-Partitions (ISP), disabling Multiple Transform Selection (MTS), disabling Low-Frequency Non-Separable Transform (LFNST), disabling Joint Coding of Chroma Residuals (JCCR), disabling Dependent Quantization (DQ), as well as the VVC tools for In-loop Filtering: disabling Deblocking Filter (DF), disabling Sample Adaptive Offset (SAO), disabling Adaptive Loop Filter (ALF), and disabling Lima Mapping with Chroma Scaling (LMCS).

Implicit Mode

In the implicit mode, the RRS(CU) is used directly in the rate-distortion function. Since this function determines the cost of the encoding decisions, this adjustment is implicitly affecting all other aspects of the encoding (partitioning, motion estimation, transform/quantization, etc.)

The standard RD function is of the following form: $J=D+\lambda R$, where J is the cost function, D is the distortion measure and R is the bitrate, with the Lagrange multiplier $\lambda$ that is used for the unconstrained optimization. The objective of the encoder is to find the encoding parameter set that minimizes the cost function J (find min(J)). The adjusted RD function is then $J=D+\lambda_R R$, where $\lambda_R$ is calculated as $$\lambda_R = \lambda(1 + c(d - RSS(CU)).$$

Here we are assuming that the RSS(CU) is normalized to the range (0.0, 1.0). In the formula, c is the adjustment coefficient from the range (0.0, 1.0), and d is the shift coefficient. For example, if c=0.2, d=0.5, formula becomes:

$$\lambda_R = \lambda(1 + 0.2(0.5 - RSS(CU)).$$

So, $\lambda_R=\lambda$ for RRS(CU)=0.0, while $\lambda_R=0.9\lambda$ for RRS (CU)= 1.0.

The value of $\lambda_R$ decreases with the higher RSS(CU), resulting in a higher bitrate used for those coding units, and opposite for the coding units with the lower relevance. The right coefficients can be calculated based on the application and use case. They can also be trained using neural networks to achieve desirable rate-distortion cost for a given set of features.

Figure 8:
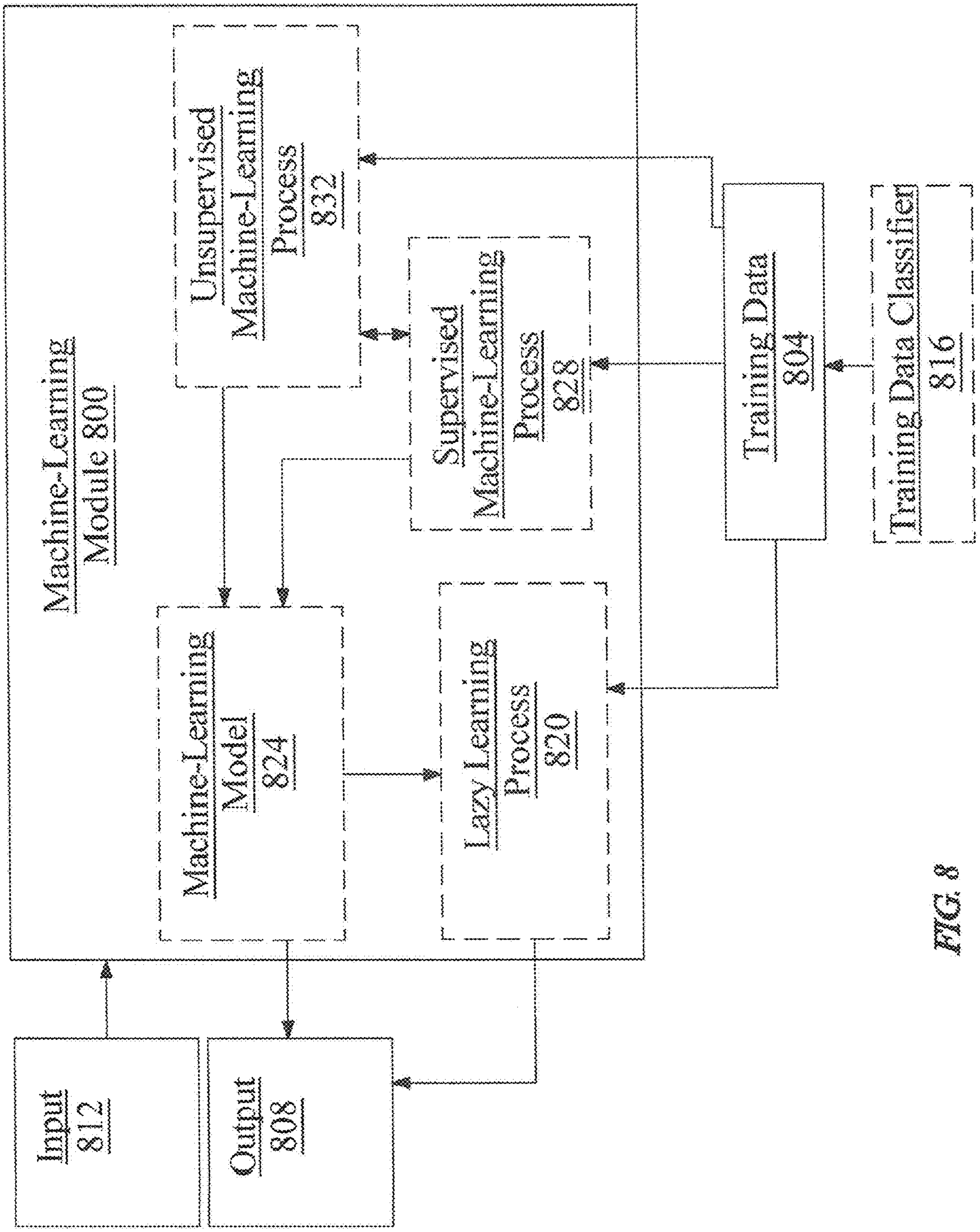
FIG. 8 is a block diagram illustrating an exemplary embodiment of a machine-learning module.

Referring now to FIG. 8, an exemplary embodiment of a machine-learning module 800 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 804 to generate an algorithm that will be performed by a computing device/module to produce outputs 808 given data provided as inputs 812; this is in contrast to a non-machine learning software program where the commands to be executed are determined in advance by a user and written in a programming language.

Still referring to FIG. 8, "training data," as used herein, is data containing correlations that a machine-learning process may use to model relationships between two or more categories of data elements. For instance, and without limitation, training data 804 may include a plurality of data entries, each entry representing a set of data elements that were recorded, received, and/or generated together; data elements may be correlated by shared existence in a given data entry, by proximity in a given data entry, or the like. Multiple data entries in training data 804 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 804 according to various correlations; correlations may indicate causative and/or predictive links between categories of data elements, which may be modeled as relationships such as mathematical relationships by machine-learning processes as described in further detail below. Training data 804 may be formatted and/or organized by categories of data elements, for instance by associating data elements with one or more descriptors corresponding to categories of data elements. As a non-limiting example, training data 804 may include data entered in standardized forms by persons or processes, such that entry of a given data element in a given field in a form may be mapped to one or more descriptors of categories. Elements in training data 804 may be linked to descriptors of categories by tags, tokens, or other data elements; for instance, and without limitation, training data 804 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 8, training data 804 may include one or more elements that are not categorized; that is, training data 804 may not be formatted or contain descriptors for some elements of data. Machine-learning algorithms and/or other processes may sort training data 804 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatically may enable the same training data 804 to be made applicable for two or more distinct machine-learning algorithms as described in further detail below. Training data 804 used by machine-learning module 800 may correlate any input data as described in this disclosure to any output data as described in this disclosure.

Further referring to FIG. 8, training data may be filtered, sorted, and/or selected using one or more supervised and/or unsupervised machine-learning processes and/or models as described in further detail below; such models may include without limitation a training data classifier 816. Training data classifier 816 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 800 may generate a classifier using a classification algorithm, defined as a process whereby a computing device and/or any module and/or component operating thereon derives a classifier from training data 804. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 8, machine-learning module 800 may be configured to perform a lazy-learning process 820 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 804. Heuristic may include selecting some number of highest-ranking associations and/or training data 804 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 8, machine-learning processes as described in this disclosure may be used to generate machine-learning models 824. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 824 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 824 may be generated by creating an artificial neural network, such as a convolutional neural network comprising an input layer of nodes, one or more intermediate layers, and an output layer of nodes. Connections between nodes may be created via the process of "training" the network, in which elements from a training data 804 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, machine-learning algorithms may include at least a supervised machine-learning process 828. At least a supervised machine-learning process 828, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 804. Persons skilled in the art, upon reviewing the entirety of this disclosure, will be aware of various possible variations of at least a supervised machine-learning process 828 that may be used to determine relation between inputs and outputs. Supervised machine-learning processes may include classification algorithms as defined above.

Further referring to FIG. 8, machine learning processes may include at least an unsupervised machine-learning processes 832. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 8, machine-learning module 800 may be designed and configured to create a machine-learning model 824 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the clastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 8, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 9:
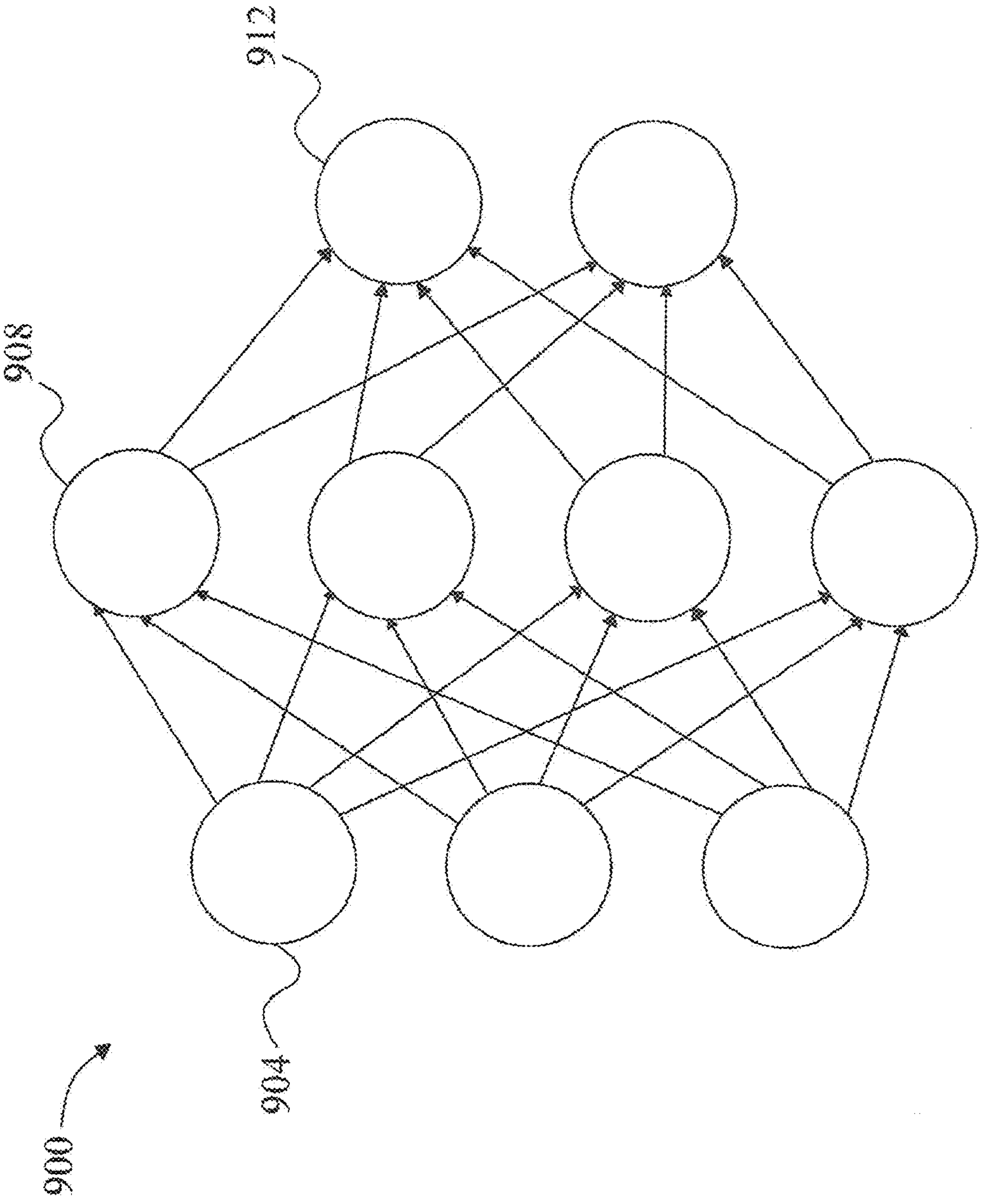
FIG. 9 is a schematic diagram illustrating an exemplary embodiment of neural network.

Referring now to FIG. 9, an exemplary embodiment of neural network 900 is illustrated. A neural network 900 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 904, one or more intermediate layers 908, and an output layer of nodes 912. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network."

Figure 10:
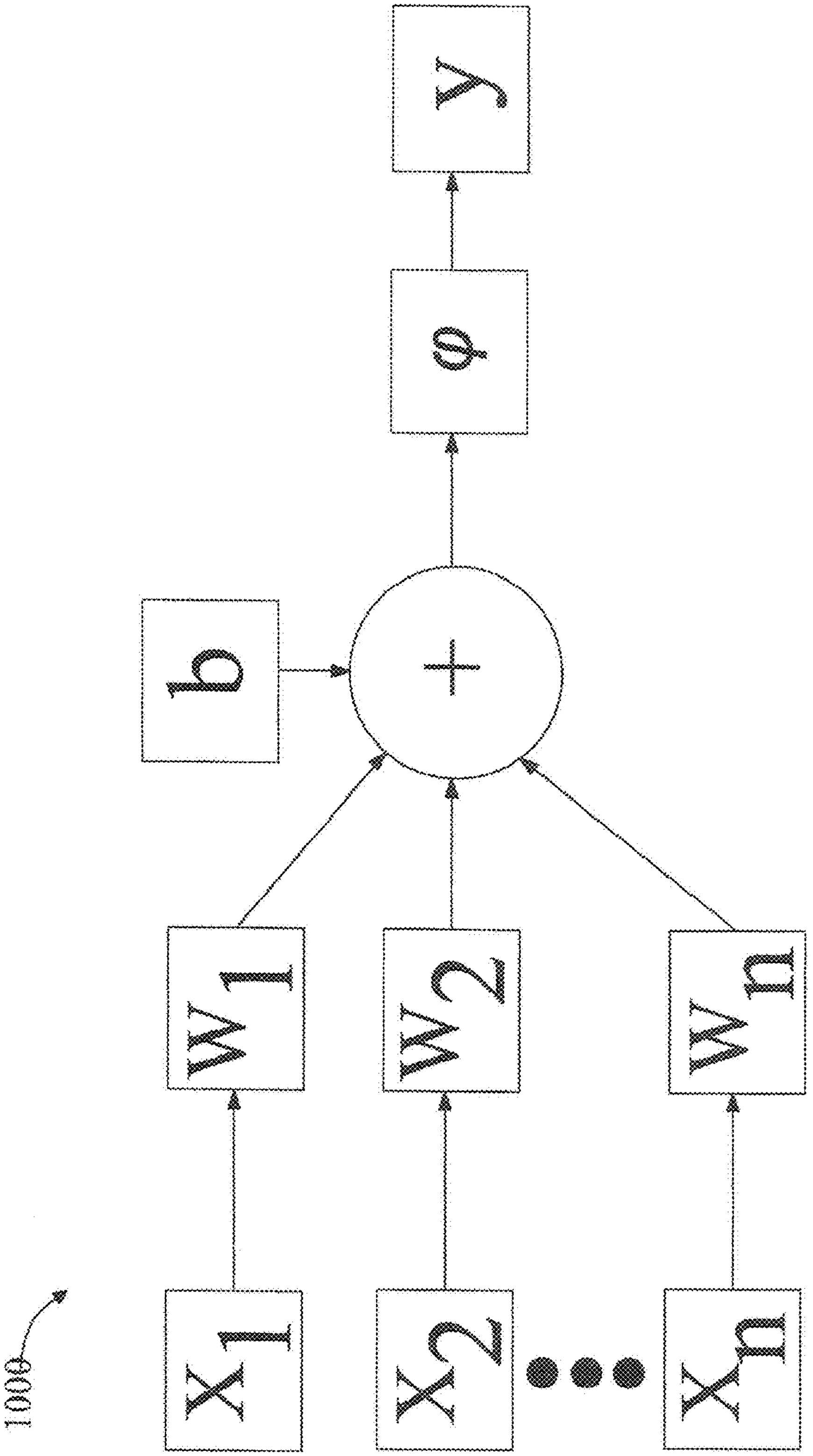
FIG. 10 is a schematic diagram illustrating an exemplary embodiment of a node of a neural network.

Referring now to FIG. 10, an exemplary embodiment of a node of a neural network is illustrated. A node may include, without limitation a plurality of inputs x; that may receive numerical values from inputs to a neural network containing the node and/or from other nodes. Node may perform a weighted sum of inputs using weights w; that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input x; may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights w; may be determined by training a neural network using training data, which may be performed using any suitable process as described above.

Still referring to FIG. 10, a "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like. CNN may include, without limitation, a deep neural network (DNN) extension, where a DNN is defined as a neural network with two or more hidden layers.

Figure 11:
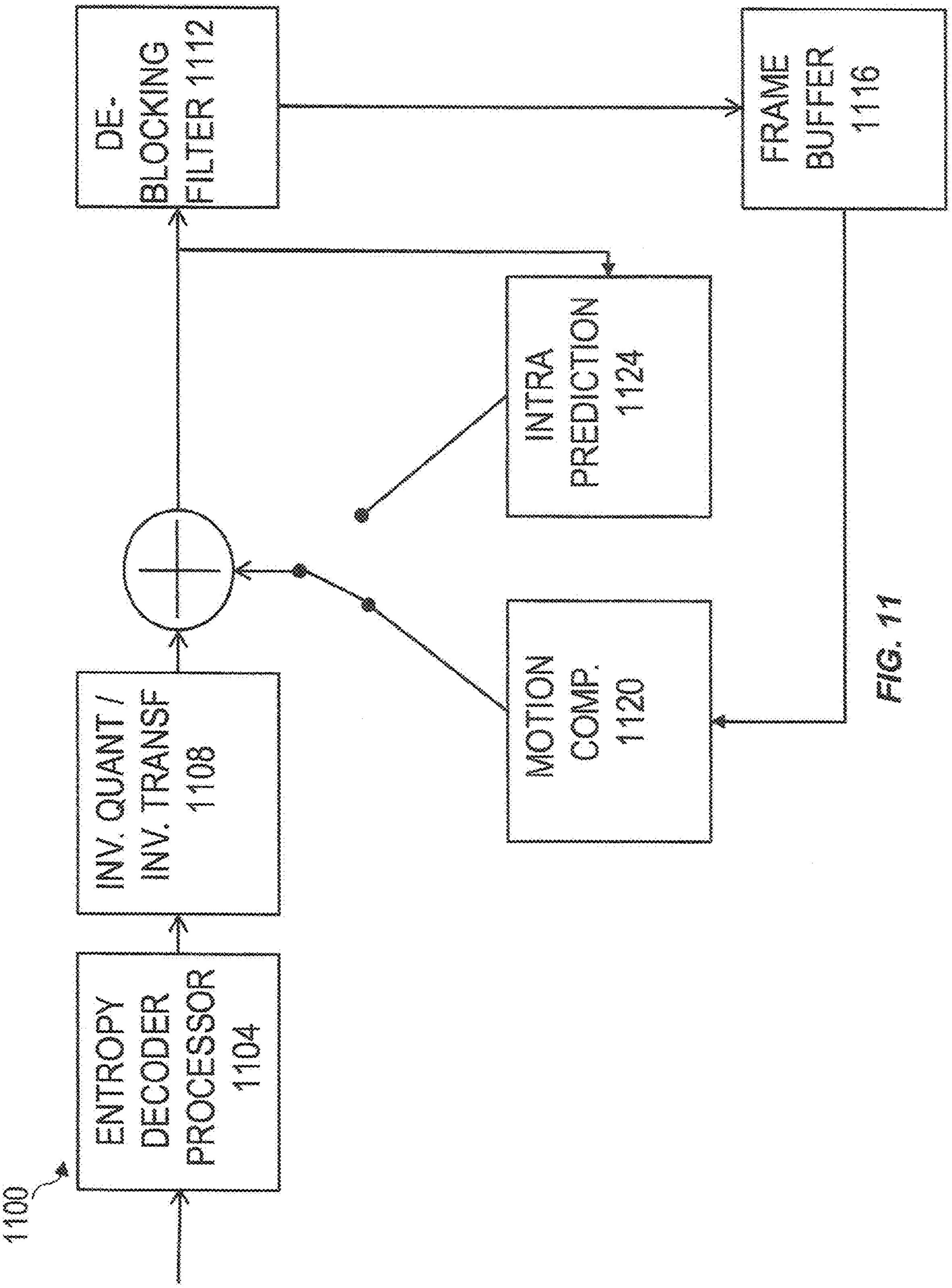
FIG. 11 is a block diagram illustrating an exemplary embodiment of a video decoder.

FIG. 11 is a system block diagram illustrating an example decoder 1100. Decoder 1100 may include an entropy decoder processor 1104, an inverse quantization and inverse transformation processor 1108, a deblocking filter 1112, a frame buffer 1116, a motion compensation processor 1120 and/or an intra prediction processor 1124.

In operation, and still referring to FIG. 11, bit stream 1128 may be received by decoder 1100 and input to entropy decoder processor 1104, which may entropy decode portions of bit stream into quantized coefficients. Quantized coefficients may be provided to inverse quantization and inverse transformation processor 1108, which may perform inverse quantization and inverse transformation to create a residual signal, which may be added to an output of motion compensation processor 1120 or intra prediction processor 1124 according to a processing mode. An output of the motion compensation processor 1120 and intra prediction processor 1124 may include a block prediction based on a previously decoded block. A sum of prediction and residual may be processed by deblocking filter 1112 and stored in a frame buffer 1116.

In an embodiment, and still referring to FIG. 11 decoder 1100 may include circuitry configured to implement any operations as described above in any embodiment as described above, in any order and with any degree of repetition. For instance, decoder 1100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Decoder may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 12:
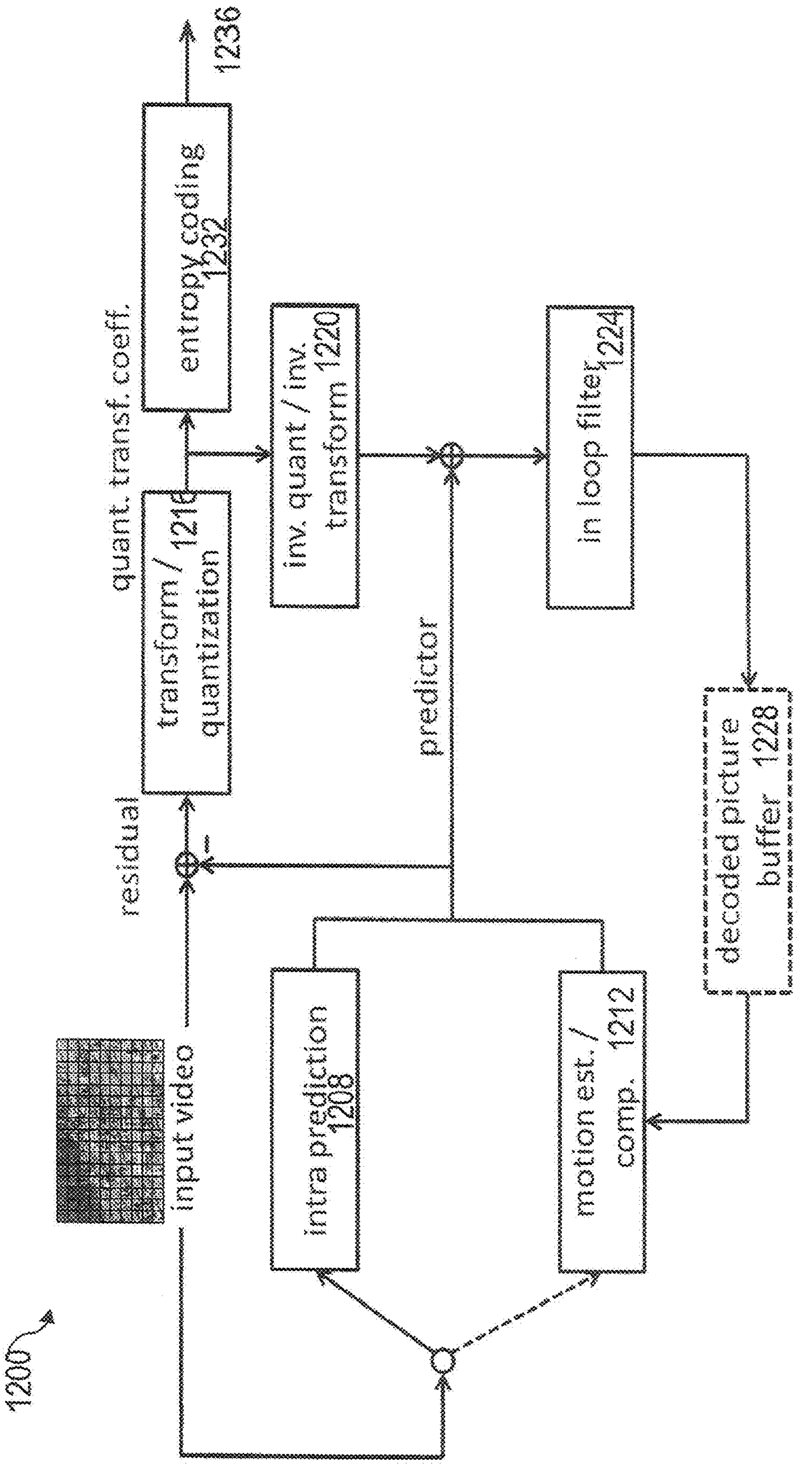
FIG. 12 is a block diagram illustrating an exemplary embodiment of a video encoder.

FIG. 12 is a system block diagram illustrating an example video encoder 1200. Example video encoder 1200 may receive an input video 1204, which may be initially segmented or dividing according to a processing scheme, such as a tree-structured macro block partitioning scheme (e.g., quad-tree plus binary tree). An example of a tree-structured macro block partitioning scheme may include partitioning a picture frame into large block elements called coding tree units (CTU). In some implementations, each CTU may be further partitioned one or more times into a number of sub-blocks called coding units (CU). A final result of this portioning may include a group of sub-blocks that may be called predictive units (PU). Transform units (TU) may also be utilized.

Still referring to FIG. 12, example video encoder 1200 may include an intra prediction processor 1208, a motion estimation/compensation processor 1212, which may also be referred to as an inter prediction processor, capable of constructing a motion vector candidate list including adding a global motion vector candidate to the motion vector candidate list, a transform/quantization processor 1216, an inverse quantization/inverse transform processor 1220, an in-loop filter 1224, a decoded picture buffer 1228, and/or an entropy coding processor 1232. Bit stream parameters may be input to the entropy coding processor 1232 for inclusion in the output bit stream 1236.

In operation, and with continued reference to FIG. 12, for each block of a frame of input video, whether to process block via intra picture prediction or using motion estimation/compensation may be determined. Block may be provided to intra prediction processor 1208 or motion estimation/compensation processor 1212. If block is to be processed via intra prediction, intra prediction processor 1208 may perform processing to output a predictor. If block is to be processed via motion estimation/compensation, motion estimation/compensation processor 1212 may perform processing including constructing a motion vector candidate list including adding a global motion vector candidate to the motion vector candidate list, if applicable.

Further referring to FIG. 12, a residual may be formed by subtracting a predictor from input video. Residual may be received by transform/quantization processor 1216, which may perform transformation processing (e.g., discrete cosine transform (DCT)) to produce coefficients, which may be quantized. Quantized coefficients and any associated signaling information may be provided to entropy coding processor 1232 for entropy encoding and inclusion in output bit stream 1236. Entropy encoding processor 1232 may support encoding of signaling information related to encoding a current block. In addition, quantized coefficients may be provided to inverse quantization/inverse transformation processor 1220, which may reproduce pixels, which may be combined with a predictor and processed by in loop filter 1224, an output of which may be stored in decoded picture buffer 1228 for use by motion estimation/compensation processor 1212 that is capable of constructing a motion vector candidate list including adding a global motion vector candidate to the motion vector candidate list.

With continued reference to FIG. 12, although a few variations have been described in detail above, other modifications or additions are possible. For example, in some implementations, current blocks may include any symmetric blocks (8×8, 16×16, 32×32, 64×64, 128×128, and the like) as well as any asymmetric block (8×4, 16×8, and the like).

In some implementations, and still referring to FIG. 12, a quadtree plus binary decision tree (QTBT) may be implemented. In QTBT, at a Coding Tree Unit level, partition parameters of QTBT may be dynamically derived to adapt to local characteristics without transmitting any overhead. Subsequently, at a Coding Unit level, a joint-classifier decision tree structure may eliminate unnecessary iterations and control the risk of false prediction. In some implementations, LTR frame block update mode may be available as an additional option available at every leaf node of QTBT.

In some implementations, and still referring to FIG. 12, additional syntax elements may be signaled at different hierarchy levels of bitstream. For example, a flag may be enabled for an entire sequence by including an enable flag coded in a Sequence Parameter Set (SPS). Further, a CTU flag may be coded at a coding tree unit (CTU) level.

Some embodiments may include non-transitory computer program products (i.e., physically embodied computer program products) that store instructions, which when executed by one or more data processors of one or more computing systems, cause at least one data processor to perform operations herein.

Still referring to FIG. 12, encoder 1200 may include circuitry configured to implement any operations as described above in any embodiment, in any order and with any degree of repetition. For instance, encoder 1200 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Encoder 1200 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 12, non-transitory computer program products (i.e., physically embodied computer program products) may store instructions, which when executed by one or more data processors of one or more computing systems, causes at least one data processor to perform operations, and/or steps thereof described in this disclosure, including without limitation any operations described above and/or any operations decoder 900 and/or encoder 1200 may be configured to perform. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, or the like.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 13:
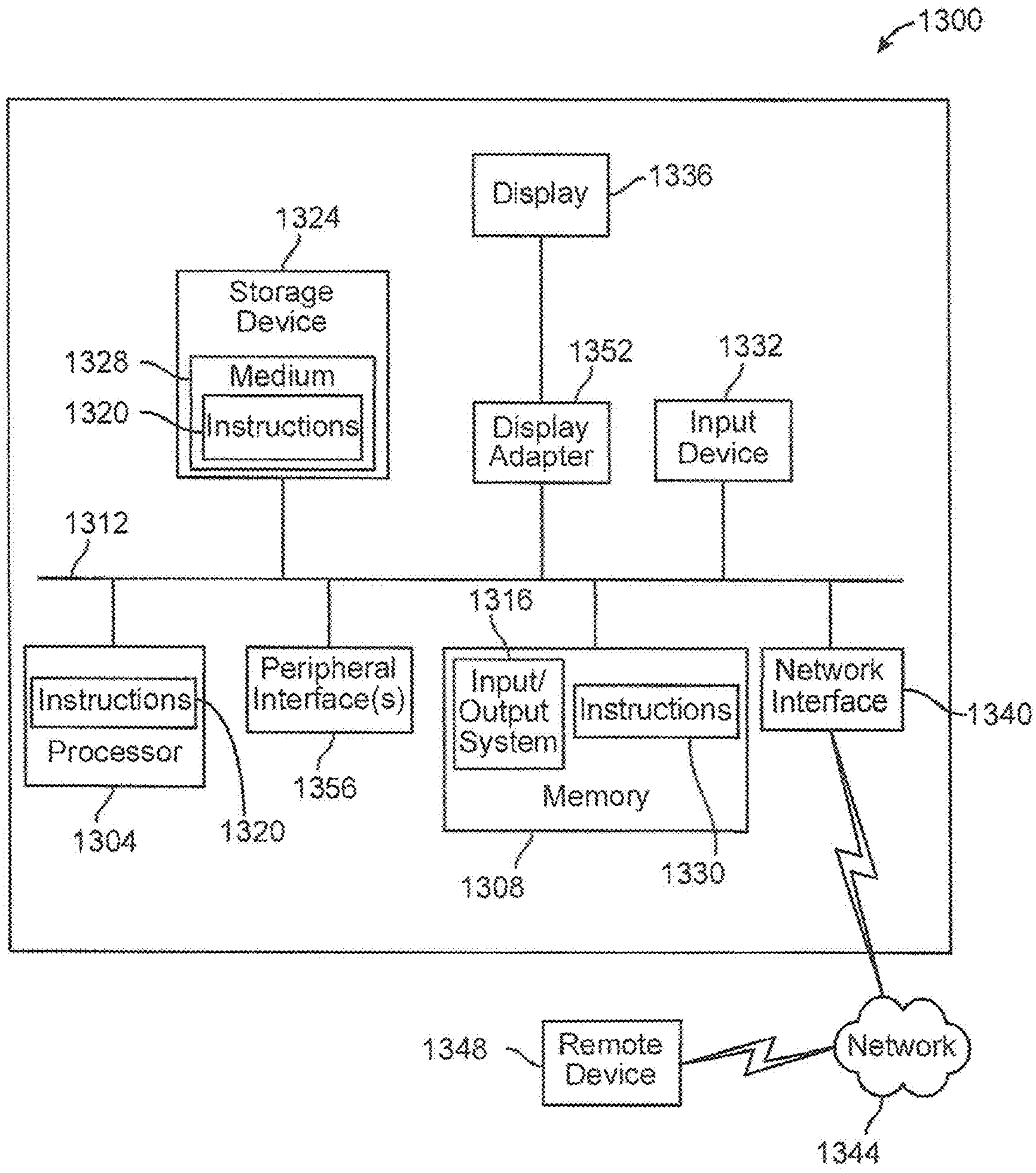
FIG. 13 is a block diagram of a computing system that can be used to implement any one or more of the methodologies disclosed herein and any one or more portions thereof.

FIG. 13 shows a diagrammatic representation of one embodiment of a computing device in the exemplary form of a computer system 1300 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1300 includes a processor 1304 and a memory 1308 that communicate with each other, and with other components, via a bus 1312. Bus 1312 may include any of several types of bus structures including, but not limited to, a memory bus, a memory controller, a peripheral bus, a local bus, and any combinations thereof, using any of a variety of bus architectures.

Processor 1304 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1304 may be organized according to Von Neumann and/or Harvard architecture as a non-limiting example. Processor 1304 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC)

Memory 1308 may include various components (e.g., machine-readable media) including, but not limited to, a random-access memory component, a read only component, and any combinations thereof. In one example, a basic input/output system 1316 (BIOS), including basic routines that help to transfer information between elements within computer system 1300, such as during start-up, may be stored in memory 1308. Memory 1308 may also include (e.g., stored on one or more machine-readable media) instructions (e.g., software) 1320 embodying any one or more of the aspects and/or methodologies of the present disclosure. In another example, memory 1308 may further include any number of program modules including, but not limited to, an operating system, one or more application programs, other program modules, program data, and any combinations thereof.

Computer system 1300 may also include a storage device 1324. Examples of a storage device (e.g., storage device 1324) include, but are not limited to, a hard disk drive, a magnetic disk drive, an optical disc drive in combination with an optical medium, a solid-state memory device, and any combinations thereof. Storage device 1324 may be connected to bus 1312 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1324 (or one or more components thereof) may be removably interfaced with computer system 1300 (e.g., via an external port connector (not shown)). Particularly, storage device 1324 and an associated machine-readable medium 1328 may provide nonvolatile and/or volatile storage of machine-readable instructions, data structures, program modules, and/or other data for computer system 1300. In one example, software 1320 may reside, completely or partially, within machine-readable medium 1328. In another example, software 1320 may reside, completely or partially, within processor 1304.

Computer system 1300 may also include an input device 1332. In one example, a user of computer system 1300 may enter commands and/or other information into computer system 1300 via input device 1332. Examples of an input device 1332 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1332 may be interfaced to bus 1312 via any of a variety of interfaces (not shown) including, but not limited to, a serial interface, a parallel interface, a game port, a USB interface, a FIREWIRE interface, a direct interface to bus 1312, and any combinations thereof. Input device 1332 may include a touch screen interface that may be a part of or separate from display 1336, discussed further below. Input device 1332 may be utilized as a user selection device for selecting one or more graphical representations in a graphical interface as described above.

A user may also input commands and/or other information to computer system 1300 via storage device 1324 (e.g., a removable disk drive, a flash drive, etc.) and/or network interface device 1340. A network interface device, such as network interface device 1340, may be utilized for connecting computer system 1300 to one or more of a variety of networks, such as network 1344, and one or more remote devices 1348 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1344, may employ a wired and/or a wireless mode of communication. In general, any network topology may be used. Information (e.g., data, software 1320, etc.) may be communicated to and/or from computer system 1300 via network interface device 1340.

Computer system 1300 may further include a video display adapter 1352 for communicating a displayable image to a display device, such as display device 1336. Examples of a display device include, but are not limited to, a liquid crystal display (LCD), a cathode ray tube (CRT), a plasma display, a light emitting diode (LED) display, and any combinations thereof. Display adapter 1352 and display device 1336 may be utilized in combination with processor 1304 to provide graphical representations of aspects of the present disclosure. In addition to a display device, computer system 1300 may include one or more other peripheral output devices including, but not limited to, an audio speaker, a printer, and any combinations thereof. Such peripheral output devices may be connected to bus 1312 via a peripheral interface 1356. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed:

1. A method of encoding video for a machine video application comprising:

using a convolutional neural network, extract at least one feature map from a picture in a video frame;

map the at least one feature map into the pixel space of the video frame to determine at least one rectangular region of interest in the pixel space;

identifying a rectangular bounding box for each of the at least one region of interest, each rectangular bounding box having associated location information;

and encode the video frame using an MPEG encoder, wherein the at least one rectangular region of interest being encoded at a higher quality than other regions of the video frame generating an encoded bitstream.

2. The method of claim 1, wherein the bounding box the location information includes coordinates of a specific corner and the width and height of the bounding box.

3. The method of claim 1, wherein the location information is inserted into the bitstream as supplemental enhancement information.

4. The method of claim 1, wherein the bitstream includes a slice header and the slice header is used to signal the presence of a region of interest in a given slice.

5. The method of claim 1 wherein the MPEG encoder is one of a VVC compliant encoder or an HEVC compliant encoder.

6. The method of claim 1 wherein a region of interest comprises a rectangular array of coding units inside the rectangular bounding box.

7. The method of claim 6 wherein the number of bits allocated by the MPEG encoder to each coding unit inside the bounding box is determined using a rate-distortion loss function.

8. The machine video encoder of claim 6 wherein a coding unit inside the region of interest is encoded by the MPEG encoder using a smaller quantization parameter than a coding unit outside the region of interest.

9. The machine video encoder of claim 1, wherein the location information is signaled in the bitstream.

10. The machine video encoder of claim 9, wherein the location information is included in one of an SEI message or a slice header.

* * * * *